Figures 5, 10:
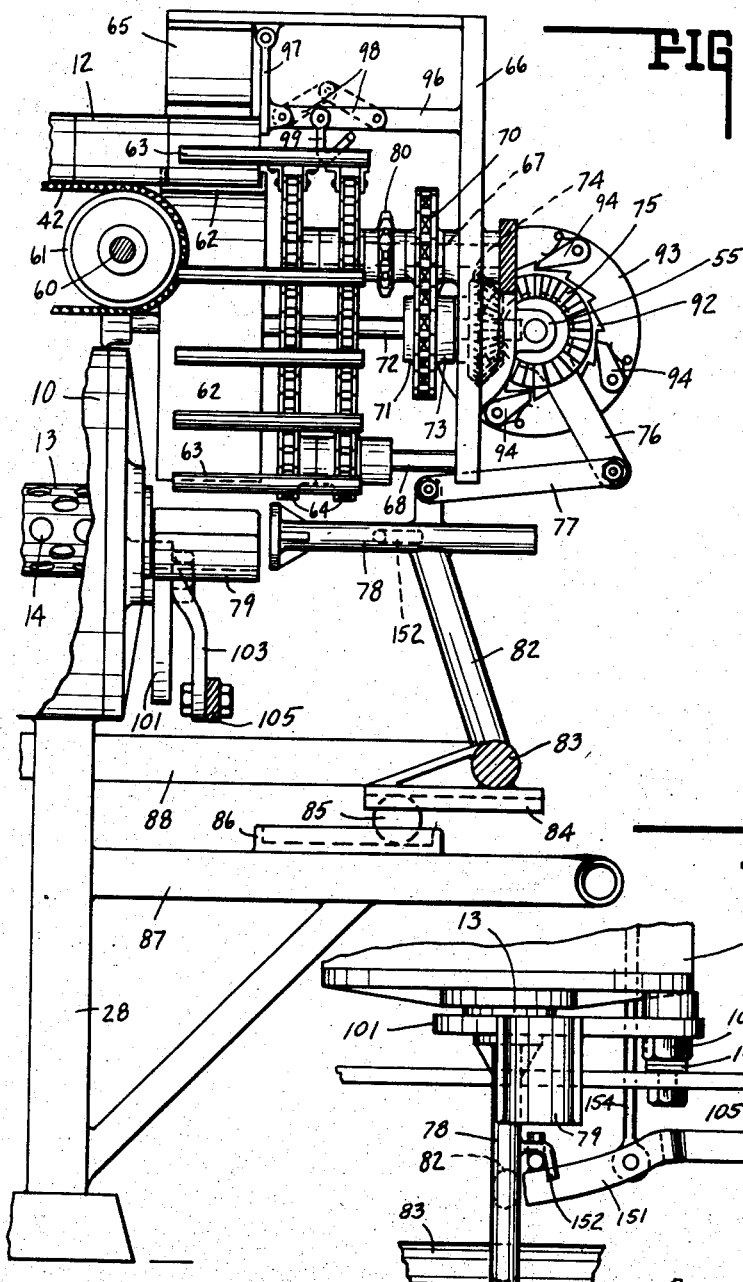

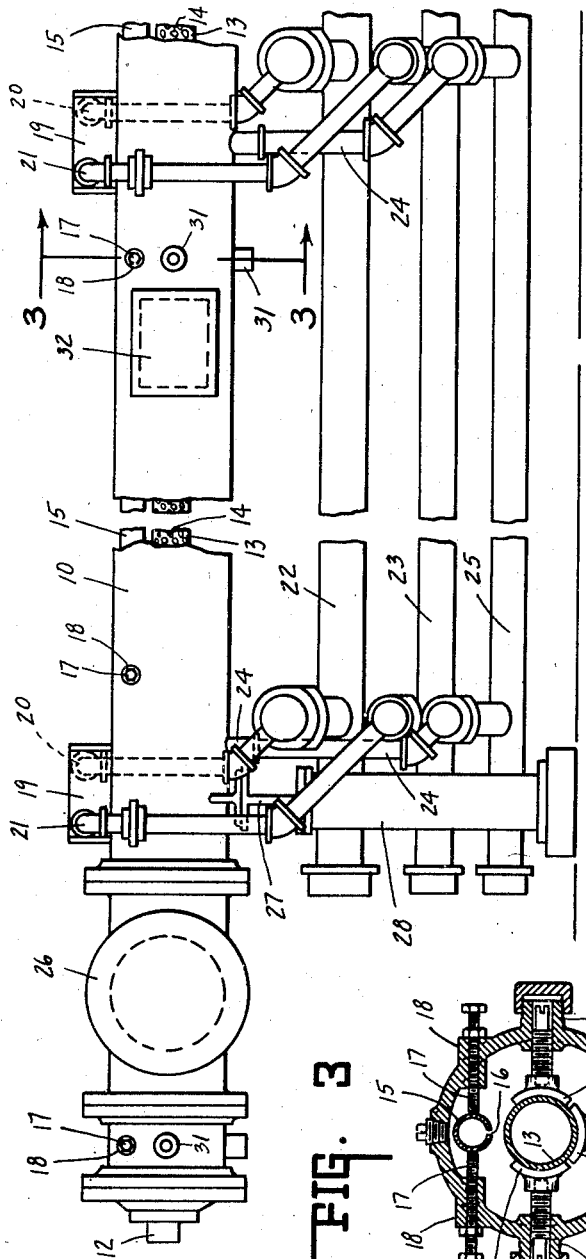

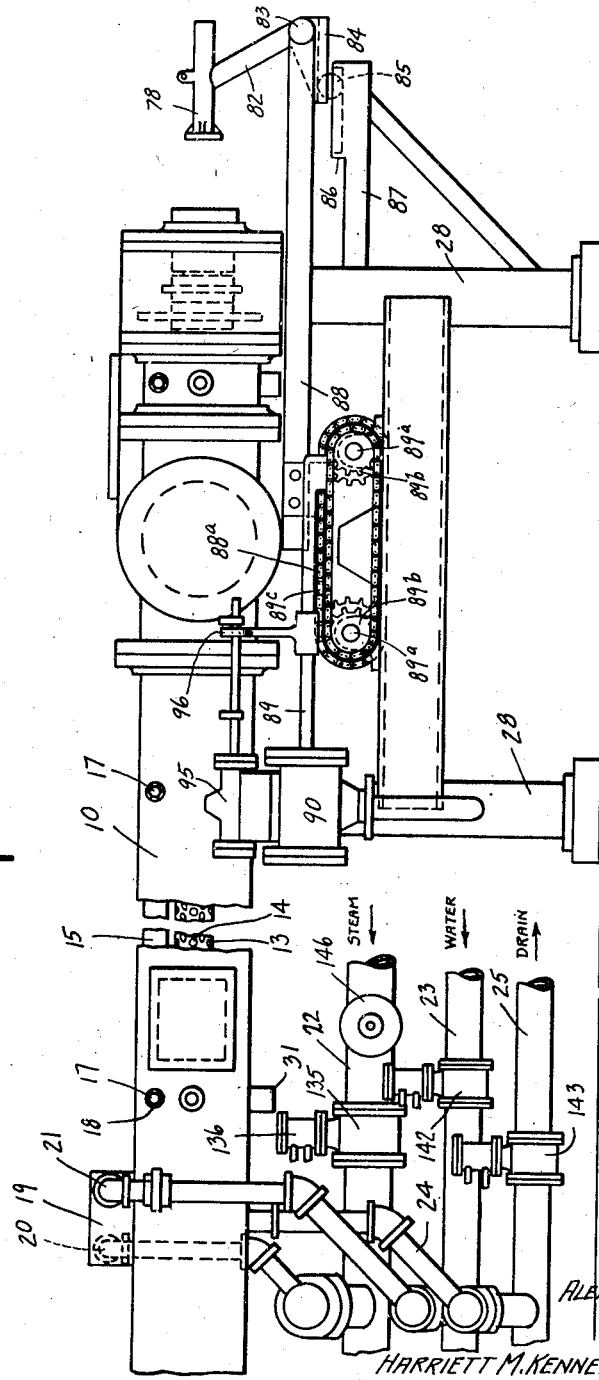

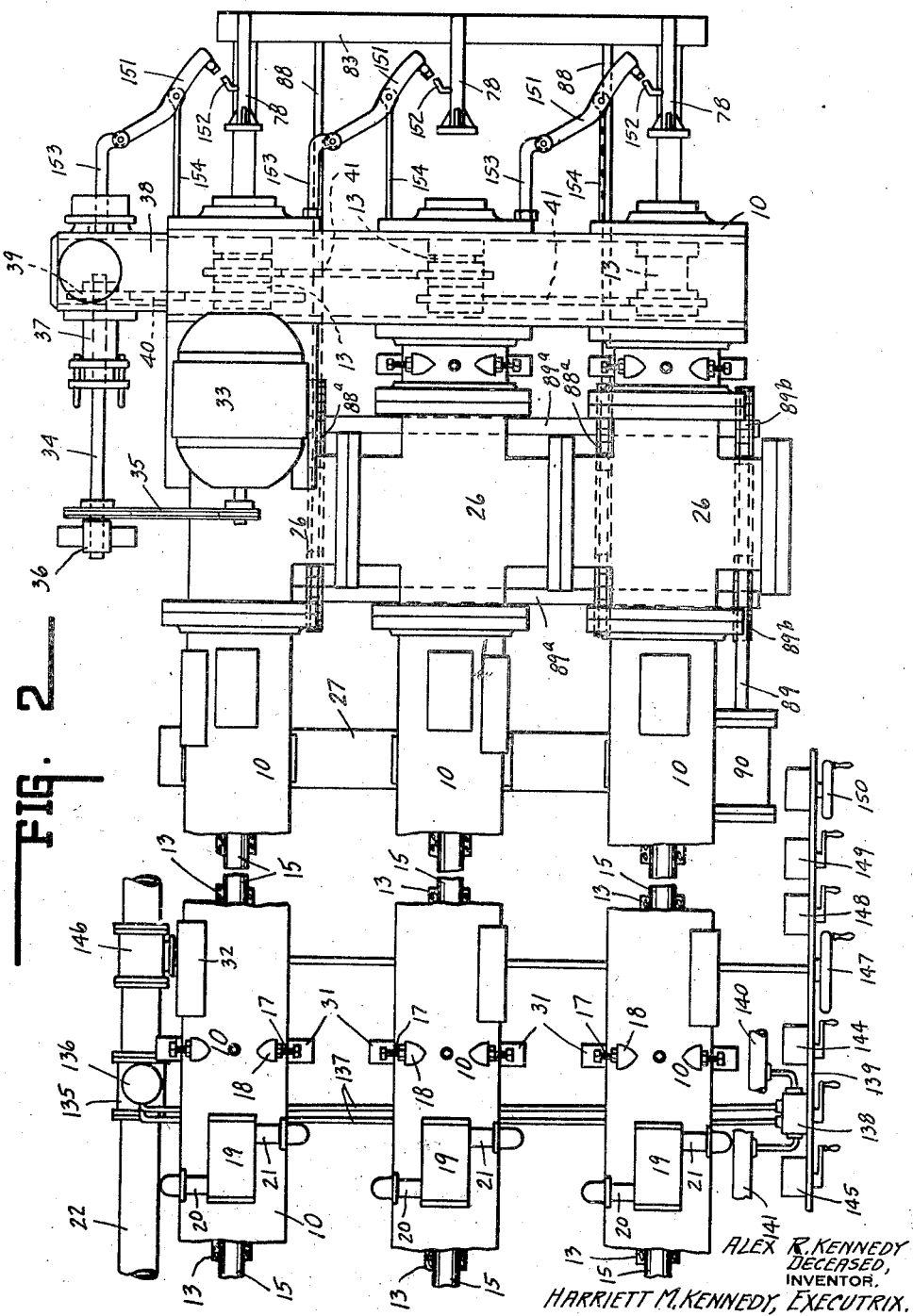

June 22, 1943.                A. R. KENNEDY                2,322,693
                    METHOD FOR PROCESSING CANNED FOODS
              Original Filed Nov. 16, 1940    6 Sheets-Sheet 4
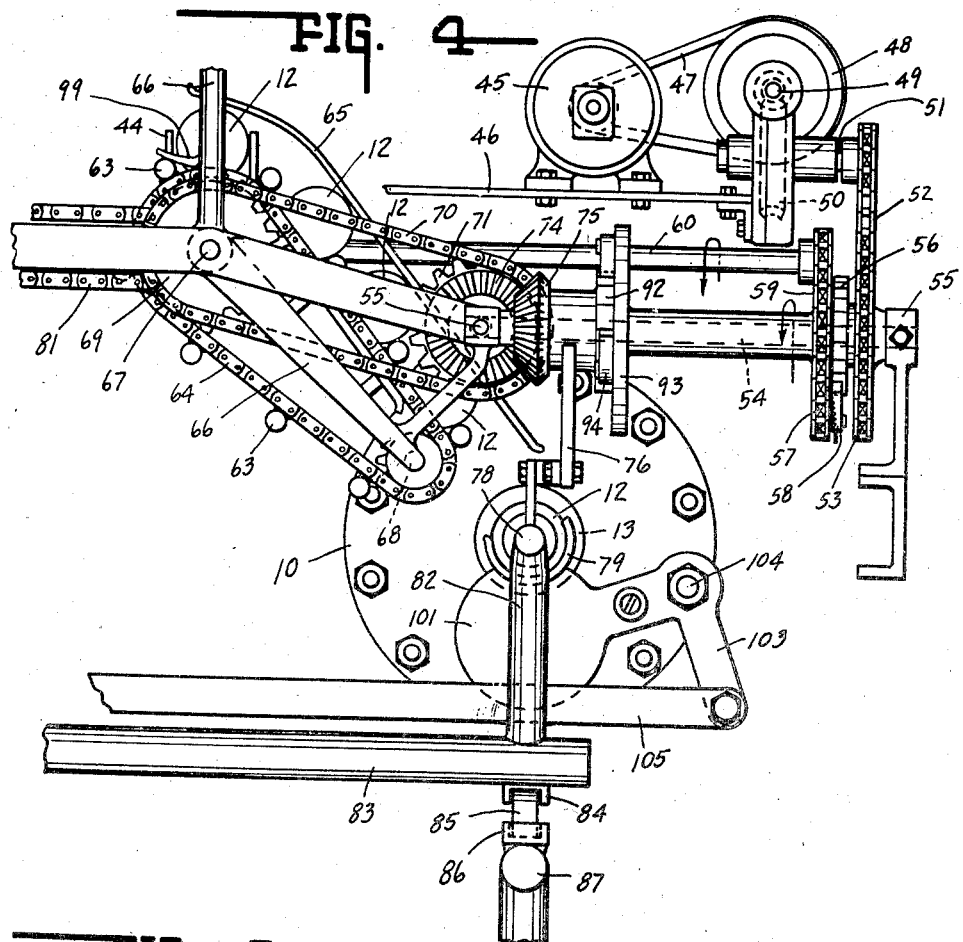
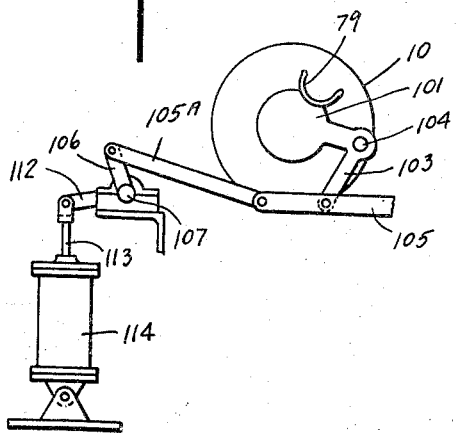
ALEX R. KENNEDY, DECEASED.
                    INVENTOR.
HARRIETT M. KENNEDY, EXECUTRIX
          Lockwood, Goldsmith & Galt
                              ATTORNEYS.

June 22, 1943.  A. R. KENNEDY  2,322,693
METHOD FOR PROCESSING CANNED FOODS
Original Filed Nov. 16, 1940  6 Sheets-Sheet 5

ALEX R. KENNEDY, DECEASED,
INVENTOR.
HARRIETT M. KENNEDY, EXECUTRIX.
BY
Lockwood, Goldsmith & Galt.
ATTORNEYS.

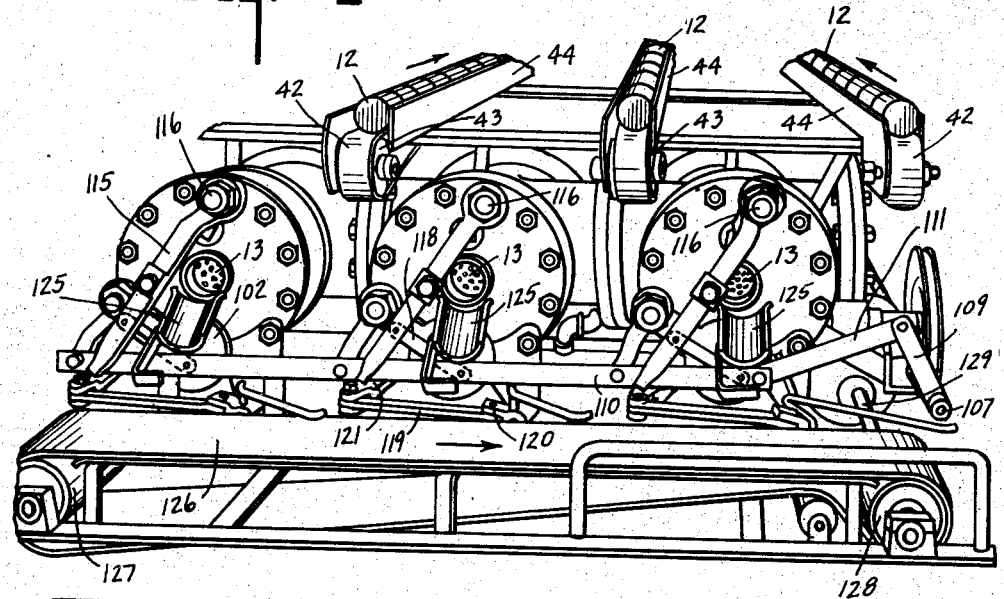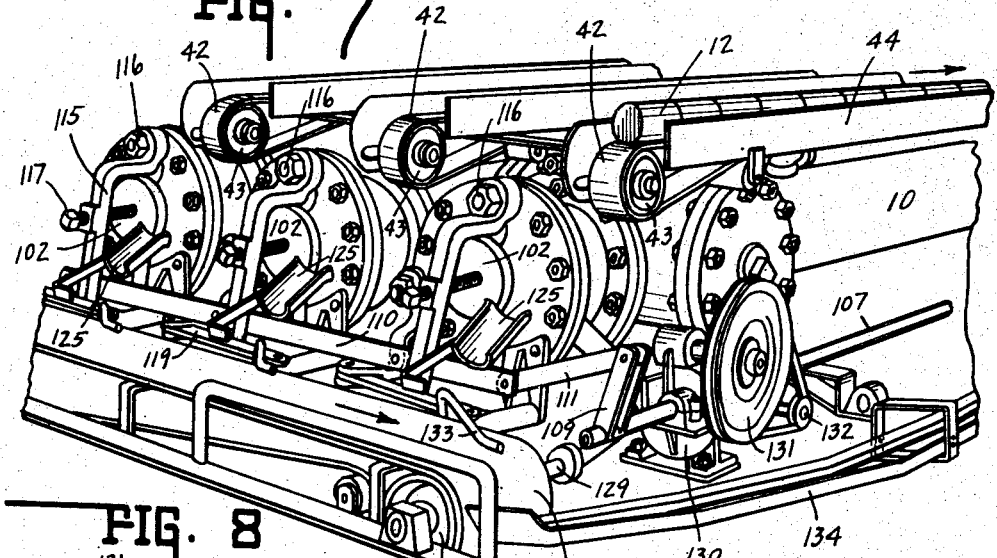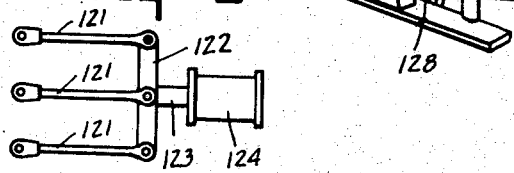

Patented June 22, 1943

2,322,693

UNITED STATES PATENT OFFICE 2,322,693

METHOD FOR PROCESSING CANNED FOODS

Alex R. Kennedy, deceased, late of Indianapolis, Ind., by Harriett M. Kennedy, executrix, Indianapolis, Ind., assignor to Indiana Condensed Milk Company, Indianapolis, Ind., a corporation Original application November 16, 1940, Serial No. 365,906. Divided and this application July 17, 1941, Serial No. 402,808

2 Claims. (Cl. 53—20)

This invention pertains to a method for processing canned foods, and particularly condensed or evaporated milk and milk food products, such as ice cream mix, being a division of application Serial No. 365,906, filed November 16, 1940, entitled "Method and apparatus for processing canned foods."

The invention herein disclosed is directed primarily to the method of sterilizing canned food products embodying milk, such as an ice cream mix, after it has been sealed in the can, whereby such a product may be subjected to sterilization through application of high heat without scorching or tending to separate the solids. This is accomplished in general by subjecting the sealed can containing such product to a preheating, followed by cooking at a high temperature, while the can is continuously rotated at high speed. This is immediately followed by continued cooking while the can and contents thereof are held dormant, followed by agitation through rotation thereof during a cooling period, wherein the temperature is reduced to approximately room temperature, all as hereinafter more fully set forth and described.

A further object of the invention is to provide a suitable method for effecting the above or similar processing, reference being had to Patent No. 2,056,526, issued October 6, 1936, for "Method of processing canned products." Said method embodies the use of one or more elongated tubes which comprise a processing chamber into which a heating medium, such as steam, is injected for preheating and cooking, followed by the introduction of water for cooling. Each of said tubular chambers contains a rotating carrier in which a batch or a series of cans are supported for rotation in end to end relation. The feeding of each batch of cans into the carrier at one end simultaneously ejects the processed cans from the other end. Upon each batch of cans being fed into the machine, they are processed in a batch before being ejected.

One feature of the invention resides in the intermittent agitation through rotation of the cans and the non-agitation thereof during the cooking period. Thus, the method particularly contemplates agitating the contents of the can by rotation, while subjecting the contents thereof to the cooking temperature and thereafter discontinuing the rotation of the cans while simultaneously therewith slightly lowering the temperature while the cans are stationary, followed by further rotation or agitation while applying a cooling medium.

Other objects and features of the invention will be understood from the accompanying drawings and the following description and claims:

Figs. 1A and 1B together form a side elevation of a preferred form of the apparatus with moving parts removed to show more clearly the arrangement of processing chambers and associated piping. Fig. 2 is a plan view of the front or input end of the apparatus with some of the moving parts shown but with the greater part thereof removed. Fig. 3 is a cross sectional view in elevation taken substantially on the line 3—3 of Fig. 1A. Fig. 4 is an end view of the input end of one of the processing units showing the mechanism used for feeding cans thereto. Fig. 5 is a side view of the mechanism of Fig. 4 with parts in section. Figs. 6 and 7 are perspective views of the opposite or discharge end of the apparatus, Fig. 6 showing the parts in position for discharging the cans therefrom and Fig. 7 showing the parts in position assumed during processing. Fig. 8 is a plan view of certain mechanism used for operating the parts shown in Figs. 6 and 7. Fig. 9 is an elevational view of certain parts associated with the input end of the apparatus. Fig. 10 is a plan view of the clamping mechanism for the closure plates.

For purpose of illustration, the method and apparatus is herein disclosed as pertaining to an ice cream mix, the principal ingredients of which are milk, sugar and flavoring, all as well known in the art.

Upon developing the ice cream mix, it is placed in cans, usually of the pint size, which are sealed preparatory to being sterilized. As will be described in respect to the apparatus employed, a batch of said cans, of any number, but, for example, about 60, are injected end to end into a tubular carrier which is rotated for imparting to said batch of cans a high speed of rotation about their aligned axes. Said cans are then subjected, while being rotated, to a preheating temperature of 210 degrees F., for a duration of two minutes. This is accomplished by injecting sufficient steam into a tubular chamber encircling the rotating carrier.

Following the preheating of the cans and during their continued rotation, they are subjected to a cooking operation by increasing the steam supply until the temperature in the chamber is raised to 255 degrees F. Such cooking operation is continued for two and one-half minutes. Thereupon the rotation of the cans is discontinued so that their rotating carrier is brought to a standstill and the cans lie dormant therein.

During this operation, the cooking temperature is slightly decreased to 250 degrees F. for a duration of three minutes.

Following the second phase of the cooking operation, the cans are again rotated about their axes while being cooled. During this period the steam in the processing chamber is discharged while cooling water is introduced to rapidly decrease the temperature from 250 degrees F. down to about 90 degrees F., or less. The cooling operation is continued for a period of about five minutes, after which the processed cans are removed from the apparatus and the processing thereof discontinued by injecting another batch of cans into the feeding end of the carrier and thereby forcing the processed cans from the discharge end of the carrier. Upon the processed cans having thus been discharged, the carrier will thereupon be filled with a new batch of cans to be processed, and the same procedure is again followed with respect thereto.

The apparatus for carrying out the above method of processing, and as illustrating herein, comprises primarily a series of longitudinally extending tubular housings 10 defining the processing chamber 11 (Fig. 3). The unit herein disclosed embodies a series of three such housings and chambers extending parallel with each other in the same plane and slightly spaced apart, thus having a capacity three times that of a single processor.

The cans containing the product, ice cream mix in this instance, are indicated at 12 and are slidably fed end to end into a tubular carrier 13 extending completely through the housing 10. Said carrier is supported for rotation within the processing chamber and spaced from the walls thereof. It is preferably formed of a tube having numerous perforations 14 formed thereabout. Immediately above the carrier 13 and similarly extending longitudinally throughout the full length of the processing chamber 11 there is provided a manifold 15 through which the heating medium and the cooling medium, such as steam and water, are introduced into the chamber and sprayed over the carrier and cans. Said manifold is in the form of a pipe which is split longitudinally thereof along the bottom, as indicated at 16, the steam or water being discharged or sprayed through the slot 16 directly downwardly onto the carrier and cans. In order that such heating and cooling medium may be evenly distributed throughout the full length of the processing chamber, the width of the slot 16 may be adjusted at various points throughout the length of the manifold by adjusting screws 17 extending against each side thereof so as to squeeze the slot and narrow it against the inherent spring tension of the metal forming the manifold. Said adjusting screws are threaded through bosses 18 in each side of the housing 10 positioned at intervals along its length. The control of the heating and cooling medium discharge by such means is essential, since each can to be processed remains in a fixed location longitudinally of the chamber and must have the same or equal treatment as that of the other cans.

The manifold 15 is fed from a series of headers 19 located at intervals along the top of the housing 10, which headers are connected with the steam and water supply, there being a steam connection 20 and a water connection 21 for each header. Steam is fed through the connection 20 from a pipe 22 and water is fed through the connection 21 from a water pipe 23. Upon water being injected into the housing, the steam condenses and is drained through drain connections 24 to a drain pipe 25. Similarly, after the cooling period the cooling water is drained from the housing.

The housings 10 are in the form of large pipe sections connected by flange fittings 26 at each end, and are supported upon the cross beams 27 resting on columns 28. In large sized units the housings may be connected by similar flanged fittings at points between their ends.

The rotating carrier 13 is rotatably supported at suitable intervals by bearings 29 which are supported in the housing by studs 30 threaded into bosses 31, there being two side bosses and one bottom boss for each bearing (Fig. 3). Adjacent each of the bearings there is a hand hole covered by a plate 32 for permitting access to the bearing and interior of the housing.

The carrier 13 is rotated by a suitable drive as best illustrated in Fig. 2, wherein there is provided a motor 33 mounted on the forward end of the apparatus. Said motor drives a shaft 34 by a belt 35, said shaft being supported in bearings 36 and 37. The driving end of the shaft extends through the bearing 37 into a housing 38 and is provided with a sprocket 39 which drives a chain 40 which in turn drives a sprocket secured to one of the carriers 13. The remaining carriers are driven in tandem by chains 41 through suitable sprockets secured to said carriers.

As shown in Figs. 6 and 7, a series of three conveyor belts 42, each carrying a supply of the cans 12, are trained about idler pulleys 43 at the discharge end of the apparatus and are suitably supported above the housings 10. Said conveyor belts extend the full length of the housings 10 and each has a capacity equal to or greater than that of the corresponding processing chamber. The cans are placed on the belts 42 manually at the discharge end of the apparatus or may be supplied thereto by suitable conveying machinery. The belts 42 accumulate a succeeding batch of cans during the time that the batch in the carrier is being processed. Said belts are power driven as hereinafter described and convey the cans 12 to the input end of the apparatus. Side walls 44 are provided therefor to maintain the cans on the belts during transit.

Referring now to Figs. 4 and 5 which show the forward or input end of one of the three housings 10, there is provided a motor 45 for driving the conveyor belts 42. Said motor is mounted on a bracket 46 and drives a speed reducing apparatus through a belt 47. Said speed reducing apparatus consists of a pulley 48 driving a worm 49 in turn driving a worm gear 50 mounted on a stub shaft 51. Shaft 51, through a sprocket on the end thereof, drives a chain 52 in turn driving a sprocket 53 freely rotatable on a shaft 54 mounted in fixed bearings 55. Sprocket 53 is connected to a ratchet clutch member 56 which drives a sprocket 57 through one or more pawls 58 secured to said sprocket. The sprocket 57 is freely mounted on the shaft 54 and drives a chain 59 in turn driving a sprocket mounted on a shaft 60. The shaft 60 extends across the forward end of the machine and carries driving pulleys 61 about which the conveyor belts 42 are trained. One of said driving pulleys is seen in Fig. 5. By means of this construction the motor 45 may drive the conveyor belts 42 at a predetermined speed. However, the speed of movement of the conveyors may be momentarily increased when the sprocket 57 is rotated at a correspondingly higher speed by mechanism to be hereinafter described. During periods of such increased speed the pawl 58 may slip over the teeth of the ratchet clutch member 56.

The cans 12 are fed from the conveyor belts 42 to the upper end of a channel shaped chute 62 adapted to conduct the cans downwardly in the path indicated by the successive cans 12 in Fig. 4. The cans are guided downwardly through said chute by bars 63 secured to conveyor chains 64 and spaced apart to receive the cans therebetween. In the downward movement the cans are prevented from leaving the chute 62 by an overhead apron 65 secured to a stationary bracket 66. The conveyor chains 64 are trained about suitable sprockets mounted on shafts 67 and 68 in turn mounted on the bracket 66. The shaft 67 carries a sprocket 69 driven by a chain 70 from a sprocket 71 carried by a shaft 72. The sprocket 71 is freely mounted on the shaft 72 and is provided with an enlarged hub 73 containing a common form of overrunning clutch by means of which rotation of the shaft 72 in one direction to move the cans downwardly on the chute 62 turns the sprocket 71, but rotation of said shaft in the opposite direction permits said sprocket to stand in place. The ratchet and pawl type of clutch similar to that shown at 56 and 58 is suitable for the purpose.

The shaft 72 carries at its outer end a bevel gear 74 meshing with a bevel gear 75 running freely on the shaft 54. The bevel gear 75 is provided with an enlarged hub to which there is attached an arm 76 connected by a link 77 to a plunger 78. Said plunger is reciprocated by mechanism to be described hereinafter and in its reciprocation it imparts through the link 77 and arm 76 an oscillatory motion to the bevel gear 75. The resulting oscillatory motion of shaft 72 intermittently drives the chains 64 and bars 63 through the overrunning clutch contained in the hub 73 to move the cans 12 down the chute 62 in timed relation with the reciprocation of the plunger. The proportioning of the several sprockets is such that each time plunger 78 is retracted a can is discharged from the lower end of the chute 62 to a receiving cup 79 aligned with the bore of the carrier 13. During the forward motion of the plunger 78 the conveyor bars 63 remain stationary to retain the cans in the chute 62 and the can just discharged from said chute is pushed by the plunger into the carrier 13.

It is to be understood that a similar arrangement of parts may be provided for each of the processing units. However, it is desirable to operate each of the sets of conveyor chains 64 from a single one of the plungers 78. For this purpose there is provided on the shaft 67 a sprocket 80 carrying a chain 81 adapted to drive the shaft 67 of the next unit to the left through a similar sprocket. The third unit is similarly driven from the second unit and thus the chains 64 of all three units are driven in unison.

The plunger 78 is mounted upon an arm 82 which in turn is mounted upon a cross bar 83. Said cross bar extends through the full width of the apparatus so as to support a plunger for each unit and is movably supported at each end by a channel 84 riding upon a roller 85 which rolls in a channel 86 mounted upon an extension 87 of the forward columns 28. For oscillating or driving the series of plungers as shown in Fig. 2 there are provided a pair of connecting rods 88, each of which is connected with a suitable connecting block to a sprocket chain 88a so that oscillation of said sprocket chains will reciprocate said plungers in timed relation. Said sprocket chains are carried by suitable sprockets mounted on the shafts 89a shown in Fig. 1B, to the ends of which are keyed the sprockets 89b. The sprockets 89b carry a master chain 89c to which the piston rod 89 is connected. Thus operation of the piston rod 89 then reciprocates the master chain 89c which in turn drives the shafts 89a through which the action is distributed to the sprocket chains 88a for reciprocating their respective connecting rods 88 and the plungers 78. The piston rod 89 is driven from a double acting steam cylinder 90. Said steam cylinder is provided with a conventional slide valve in a valve chest 95 and a conventional reversing gear 96. Its operation and speed may be controlled by a suitable throttle valve in the usual manner. The normal operating speed of the cylinder and plunger is approximately 60 cycles per minute.

It is essential that there should be a can completely fed into position on the chute 62 by the conveyor belt 42 at each operation of the conveyor rods 63 to prevent fouling the apparatus in the movement of said rods. For this reason means are provided for momentarily increasing the speed of the conveyor belt 42 during each forward movement of the plunger when the rods 63 are not moving. Said means includes a ratchet wheel 92 formed integrally with the hub of bevel gear 75, a disc or plate 93 formed integrally with the sprocket 57 and a series of spring pressed pawls 94 carried by said disc and engaging said ratchet wheel. The disc 93 is driven in the clockwise direction of Fig. 5 by the motor 45 at the normal speed of the sprocket 57. In the counterclockwise movement of the gear 75 as the plunger 78 is retracted, the pawls 94 slip over the teeth of the ratchet wheel 92 but in the clockwise movement of said gear as the plunger is moved forwardly, the ratchet may move at a greater speed than the normal speed of the disc 93 and in so doing may drive said disc at the increased speed. The pawl 58 then slips over the teeth of ratchet 56 and a forward impulse is given to the conveyors 42. Thus the complete delivery of each can to the chute 62 is insured even though the rate of operation of the plunger may be varied without changing the speed of motor 45.

For the purpose of causing the cans to be properly positioned on the chute 62, means is provided to stop the forward can when it reaches a predetermined position and cause the cans to slip with respect to the movement of the belt 42. For this purpose, there is provided a hinged stop arm 97 (Fig. 5) pivoted on a part of the bracket 66 and so positioned as to arrest the feeding movement of the forward can when it reaches the proper position on chute 62 in line with the path of movement of conveyor rods 63. The arm 97 is normally held in place by a pair of toggle links 98 pivotally connected to said arm and to the bracket 66. As the conveyor rod 63 moves into position to pick up the end can, it strikes a cam finger 99 which is connected with the toggle links 98 so as to force them upwardly to draw the stop arm 97 inwardly to relieve the pressure on the end can created by the force of all the cans back of it sliding on the belt. This permits the end can to be slightly moved forwardly free from frictional engagement with the can immediately behind it.

In the manner above described, the cans are intermittently fed in timed relation from the conveyor belt 42 down the chute 62 by the conveyor rods 63 and dropped thereby into the cup 79 each time the plunger is retracted. The forward strokes of the plunger press the cans into the carrier 13.

After the complete batch of cans is thus fed into the carrier so that it is full of cans, the operator turns off the steam in the steam cylinder 90 so that the oscillatory movement of the plunger stops. However, the belt 42 continues to be driven, but free of cans, since at this point they have all been fed into the carrier. Thus the conveyor chain 64 and the conveyor rods 63 are brought to rest, whereas the belt 42 continues to be driven for the purpose of reloading it with cans for the next batch.

After the batch has been fed into the carrier it is necessary to close both ends of the housing in such manner as to retain the steam pressure therein. For this purpose, closure discs 101 are provided at the forward or intake end of the housings (Figs. 4, 5 and 9) and corresponding closure discs 102 are provided at the discharge end (Figs. 6 and 7). Each of the discs 101 is carried by a bell crank lever 103 pivotally mounted on the end flange of the housing at 104. The free end of the bell crank lever is connected with an actuating rod 105 extending transversely of the front end of the machine and connected to operate simultaneously all closures for the several housings. Said rod is connected by a link 105A to an arm 106 extending upwardly from an operating shaft 107 (Fig. 9). Said shaft extends the full length of the machine and is supported at each end in suitable bearings. At the discharge end of the shaft 107 there is an upstanding arm 109 which is connected to an actuating bar 110 by a connecting link 111 for simultaneously and similarly operating the closure plates 102 at the discharge end. The operating shaft 107 intermediate its ends is provided with a crank arm 112 (Fig. 9) actuated by a piston rod 113 operated by a double acting air cylinder 114. Thus, the shaft may be actuated to effect simultaneous closure or opening of both ends of the housing by admission of air to one end or the other of the cylinder 114 by the usual air valves not shown.

It may be noted that the can receiving cup 79 is carried by the closure plate 101, as shown in Figs. 4 and 9, so that when the closure plate is in its lower or open position, the cup is positioned in alignment with the carrier 13, but when the plate is swung to closing position the cup is moved therewith out of the way.

For clamping the closure plates 101 in sealing position after having been moved to closing position, the plungers 78 are actuated to move forwardly by steam pressure to press the plate in sealing position. As shown in Fig. 10, the plungers are locked in their forward position by the lever 151 engaging the hook 152 secured to the plunger. Said lever has its opposite end pivotally secured to a bracket arm 153 and intermediate its ends it is pivotally connected with a draw bar 154 in turn connected with the hereinafter described draw bars 121. For clamping each of the plates 102 at the discharge end of the machine, there is provided a pressing arm 115 pivoted at 116 to the end flange of the housing and provided with an adjustable bearing screw 117 extending into engagement with the plate. Said arms are moved into sealing position by links 118 connecting the arms with the operating bar 110 (Fig. 6). Thus, when the bar 110 is actuated to swing the plates 102 into closing position the bars 115 are simultaneously actuated thereby. Thereupon the sealing pressure is applied by locking bars 119 behind which the lower ends of pressing arms 115 extend, said locking bars being pivotally connected at one end to brackets 120 and being operatively pivoted at the other end to draw bars 121. Said draw bars 121 extend longitudinally beneath the machine where they are connected to a cross member 122 actuated by a piston rod 123 extending into a double acting air cylinder 124. Said air cylinder is actuated by suitable valves to draw the bars into plate sealing position or release them to permit the plates to be swung to open position.

At the discharge end of the machine, each unit is provided with a movable can chute 125 mounted on the bar 110 so that when the plates 102 are swung to open position, the chutes 125 move into position to receive the discharged cans. On the other hand, when the plates are swung to closed position these chutes are moved to one side. Immediately under the discharge end of the chutes there is a transversely travelling conveyor belt 126 operating on the end rollers 127 and 128. The belt is driven through the pulley 128 by the shaft 129 having universal joint connection with reduction gearing contained in a housing 130, which gearing is driven by a pulley 131 from a pulley on a shaft 132 operated by an electric motor of the usual and well known character. Upon the cans sliding down the chutes 125 they strike the belt on end and are carried thereby into engagement with the guide fingers 133 which align them on the belt from which they topple over sideways on to a track 134 (Fig. 7). Thus the processed cans are caused to roll down said track to a receiving station.

The steam pipe 22, by means of which the processing steam is supplied to the apparatus, is fitted with a shut-off valve 135 provided with an air cylinder 136, the opposite ends of which are connected by pipes 137 to a reversing valve 138 mounted on a control panel 139. The reversing valve 138 is of a well known form adapted to connect the pipes 137 alternately to an air supply pipe 140 and an exhaust pipe 141. By manual operation of the reversing valve air is admitted to either end of the cylinder 136 and exhausted from the opposite end to open or close the valve 135. Similar cut-off valves 142 and 143 are provided in the water supply line 23 and drain pipe 25 respectively and may be similarly operated by reversing valves 144 and 145 mounted on the control panel 139. The piping connections for this purpose are omitted from the drawings since they are similar to those for valve 135.

A throttle valve 146 is placed in the steam supply pipe 22 and is operated by a handwheel 147 mounted on the control panel 139 to regulate the flow of steam to the processing chambers to maintain the proper pressure and temperature therein during the several steps of the process. The valve 135 is used merely to stop and start the flow of steam, the rate of supply being controlled by valve 146. In some cases the cut-off valve may be omitted and both functions are then performed by the throttle valve.

Reversing valves 148 and 149 are also mounted on the panel board 139 and are connected to control the supply of air to the cylinders 114 and 124 respectively in the manner described for valve 138. A handwheel 150 on the control panel is connected to operate a throttle valve for cylinder 90. Push button stations for controlling the operation of the several motors may also be mounted on the panel board. Thus the control of the entire apparatus including the loading and locking operations, the supply of steam and water for the processing steps and the draining of the processing chambers is centralized at a single operator's station at the control panel.

The invention has been described in one of its preferrred forms, the details of which may be varied without departing from the scope of the invention as defined by the appended claims.

The invention claimed is:

1. The method of processing a canned food product consisting in agitating the food while preheating it for a predetermined period of time to a degree of temperature but below that required for cooking it, at the end of said preheating thereof increasing the heat to bring the product to a cooking temperature while continuing to agitate it for a further predetermined period of time, thereupon discontinuing the agitation of the product and simultaneously decreasing the heat for a period of time during which the product is maintained stationary, and thereafter again agitating the product while applying a cooling medium thereto to reduce the heat thereof to normal temperature.

2. The method of processing a canned food product consisting in subjecting the product to a preheating temperature of about 210 degrees F. for a period of approximately 2 minutes, agitating said product during such preheating period, heating the product to a cooking temperature of approximately 255 degrees F. for a period of about 2½ minutes while continuing the agitation thereof, thereupon discontinuing the agitation and maintaining the product stationary while decreasing the heat to approximately 250 degrees F. and maintaining said product stationary at said temperature for a period of about 3 minutes, and thereafter again agitating the product while further decreasing the heat to a temperature of approximately 90 degrees over a period of about 5 minutes.

HARRIETT M. KENNEDY,
*Executrix of the Estate of Alex R. Kennedy, Deceased.*